United States Patent

Berman et al.

[11] Patent Number: 5,835,226
[45] Date of Patent: Nov. 10, 1998

[54] METHOD FOR DETERMINING OPTICAL CONSTANTS PRIOR TO FILM PROCESSING TO BE USED IMPROVE ACCURACY OF POST-PROCESSING THICKNESS MEASUREMENTS

[75] Inventors: Michael J. Berman; Jayashree Kalpathy-Cramer, both of WestLinn, Oreg.; Eric J. Kirchner, Gersham, Oreg.; Thomas Frederick Allen Bibby, Jr., Gilbert, Ariz.

[73] Assignee: LSI Logic Corporation

[21] Appl. No.: 970,043

[22] Filed: Nov. 13, 1997

[51] Int. Cl.⁶ .................................................. G01B 11/06
[52] U.S. Cl. ............................................ 356/382; 438/16
[58] Field of Search .................................... 356/381, 382; 438/16, 693; 451/6, 5, 8, 41; 437/8, 194, 195, 974

[56] References Cited

U.S. PATENT DOCUMENTS 4,984,894  1/1991  Kondo ..................................... 356/382
5,663,797  9/1997  Sandhu .................................... 356/382

Primary Examiner—Hoa Q. Pham
Attorney, Agent, or Firm—Kevin L. Daffer; Conley, Rose & Tayon

[57] ABSTRACT

A method for determining the thickness of a film in a film stack using reflectance spectroscopy is provided in which one of the films in the stack has unknown optical constants. Conventional methods of using reflectance measurements to determine the thickness of a film require knowledge of the thicknesses and optical constants of all underlying films. An embodiment involves forming a test layer across a substrate having a known thickness and known optical constants. The thickness of the layer is determined using reflectance measurements. A first layer of the same material is then formed across a second layer at the same conditions that the test layer was formed. Thus, the test layer and the first layer can be assumed to have the same thicknesses. A spectral response curve may be determined for the first layer. The first layer is then processed so that its thickness is no longer known. The second layer has unknown optical constants, making it difficult to use reflectance measurements to find the unknown thickness. The values of the unknown optical constants may be guessed and used with the known thickness of unprocessed first layer to create a model spectral response curve. The optical constants may be repeatably varied until the model response curve matches the measured response curve. When this happens, the reasonable optical constants have been found and may be used in determining the thickness of the processed first layer.

14 Claims, 3 Drawing Sheets

METHOD FOR DETERMINING OPTICAL CONSTANTS PRIOR TO FILM PROCESSING TO BE USED IMPROVE ACCURACY OF POST-PROCESSING THICKNESS MEASUREMENTS

BACKGROUND OF THE INVENTION

1. Field of the Invention

This invention relates to determining the thickness of a film and, more particularly, to determining unknown optical constants of a film within a film stack so that the thickness of another film within the film stack may be determined using reflectance spectroscopy.

2. Description of the Related Art

Thin layers of various materials, i.e., thin films, have become increasingly important, especially in the manufacturing of integrated circuits having VLSI devices. Thin films of metals, semiconductors, or insulators may be formed for instance. Such thin films may be, inter alia, thermally grown or deposited from the vapor phase. Thin films employed by integrated circuits have certain chemical, structural, and electrical requirements. Therefore, film composition and thickness must be strictly controlled to promote, inter alia, proper etching of submicron features. A thin film material may have properties substantially different from the properties of the same material in the bulk. For example, thin films typically have smaller grain size than bulk materials. A thin film generally has a much higher surface to volume ratio than a bulk material.

Measuring the thickness of a thin film is often necessary to ensure that the film thickness is reasonable relative to its desired value. Thus, errors in measuring thin film thicknesses may lead to unwanted problems. One type of error may cause a measured thickness value to appear to be inconsistent with respect to prescribed goodness of fit parameters. When this type of error occurs, the validity of the results are often investigated, and supplementary measurements may be performed. The error in thickness measurement may cause a delay in production of a product employing the thin film in question.

Another type of error that occurs is incorrect measurement of the thickness of a thin film. If such an error is made unknowingly, it may result in the uselessness of the product employing the thin film. For example, in the fabrication of an integrated circuit, thin films are often polished after they are formed across a non-planar surface to planarize upper surfaces of the thin films. The actual thickness of a thin film may lie near the lowest acceptable value while the measured thickness of the film is determined to be near or greater than the highest acceptable value. Because of this error, subsequent integrated circuits may be formed in which the thin film is overpolished in an attempt to make the thickness of the film approach its design specification. Overpolishing of thin films may cause integrated circuits employing the films to be inoperable.

Numerous optical methods for measuring film thicknesses may be used. The CARIS ("constant angle reflection interference spectroscopy") technique is one of the most popular methods because it is very accurate and because it can gather and analyze data very quickly. FIG. 1 illustrates using the CARIS technique to determine the thickness of a film 10 disposed across a substrate 12. Film 10 is illuminated by an incident white light source 14 at an angle $\theta$ relative to the perpendicular of the film surface or at an angle of $\pi/4-\theta$ relative to the film surface. The intensity of the resulting reflected light 16 is then measured over a range of wavelengths, e.g., over the 400–800 nm range. The combination of light reflected from the surface of film 10 with light reflected from the film 10/substrate 12 interface results in constructive and destructive interference of reflected light beams. The constructive and destructive interference leads to maxima and minima values in the curve of reflected intensity versus wavelength, i.e., the spectral response curve. The spectral response of a film is typically normalized with the spectral response of a bare substrate. As the thickness of a particular material varies, the spectral response curve also varies. FIG. 2 depicts the spectral response curves for varying thicknesses of oxide: 1,800 Å, 6,000 Å, and 10,000 Å. The optical constants of both the film itself and its underlying substrate are required to calculate the thickness of a film from its spectral response curve.

The optical constants of a film are its index of refraction and its extinction coefficient. The index of refraction of a material is the ratio of the speed of light in a vacuum to the speed of light in the material. Most films required in the manufacturing of integrated circuits vary inversely with wavelength. An equation known as the Cauchy equation represents the index of refraction, n, for such films as a function of wavelength:

$$n = n_1 + \frac{n_2}{\lambda^2} + \frac{n_3}{\lambda^4}$$

where $\lambda$ is the wavelength, typically expressed in angstroms (Å) and $n_1$, $n_2$, and $n_3$ are constants known as Cauchy coefficients. Some films absorb and scatter the incident light, resulting in a lower intensity of reflected light. The extinction coefficient, k, accounts for the absorption of light. The extinction coefficient is equal to zero for transparent films since such films exhibit no absorption. The extinction coefficient can be expressed by the following equation:

$$k = k_1 + \frac{k_2}{\lambda^2} + \frac{k_3}{\lambda^3}$$

where $k_1$, $k_2$, and $k_3$ are constants known as Cauchy extinction coefficients.

The thickness of a film within a stack of multiple films may be difficult to determine. Light is reflected from the upper surface of all of the films within the film stack, resulting in complex interference patterns. The thickness calculation require knowledge of the optical constants of the underlying substrate and of all of the underlying films as well as knowledge of the thicknesses of the underlying films. Unfortunately, optical constants of some thin films are unknown. For example, titanium nitride is well known for its variations in the index of refraction and in its extinction coefficient. Such variations are partially due to the anti-reflective properties of titanium nitride. At certain wavelengths, light is highly absorbed by titanium nitride which skews the interference patterns as observed from the surface of titanium nitride. Further, since titanium nitride is typically formed by reactively sputtering titanium in a nitrogen-bearing environment, titanium is often deposited as a non-stoichiometric film. The thickness of titanium nitride varies each time it is deposited even though the deposition rate and length of deposition is the same. Moreover, the surface upon which titanium nitride is deposited may be non-planar, causing interference patterns to vary across a non-uniform topography. Therefore, refraction and absorption of light passing through titanium nitride and its underlying layers may be difficult to control, causing variations in the index of refraction and extinction coefficient of titanium nitride.

Titanium nitride is often used as an anti-reflective coating over materials that exhibit a high intensity of reflected light. Titanium nitride is often formed over metal layers, such as aluminum or copper used in integrated circuit manufacturing. The metal layers may serve as interconnect routing between devices employed by the integrated circuit. The formation of metal interconnect may involve depositing a metal layer across a semiconductor topography and using optical lithography to pattern photoresist lines across the metal layer. Then areas of the metal not covered by the photoresist may be removed using an etching technique, e.g., plasma etch. Optical lithography involves exposing certain areas of the photoresist film to some form of radiation, e.g., ultraviolet light.

Standing waves are formed when light waves propagate through the resist film to the metal/resist interface, where they are reflected back up through the resist. The reflected waves constructively and destructively interfere with the incident waves, resulting in undesired effects in the photoresist layer. The periodic variation of light intensity in the resist causes the resist to receive non-uniform doses of energy throughout the photoresist layer thickness. Moreover, the variation of energy at different thicknesses causes linewidth variations as the resist crosses a step. These adverse effects contribute to a loss in resist resolution, i.e., a loss in the ability to form minimum size images in the resist while meeting certain design specifications. However, if a titanium nitride layer is interposed between the metal layer and the photoresist layer, light waves are absorbed and not reflected by the titanium nitride layer. Thus, using titanium nitride as an anti-reflective coating over a metal layer may inhibit the loss in resist resolution mentioned above.

As described previously, errors in film thickness can be extremely damaging to the processing of an integrated circuit. Unfortunately, accurately determining an unknown thickness of a film formed above a titanium nitride layer may be difficult when using the CARIS technique. The index of refraction and the extinction coefficient of titanium nitride must be known to calculate this thickness. It is therefore desirable to develop a method for determining unknown optical constants of a material so that the thicknesses of films formed above the material may be found.

SUMMARY OF THE INVENTION

The problems outlined above are in large part solved by the method of the present invention for determining unknown optical constants of a first film using reflectance spectroscopy. The first film may overly multiple layers within a stack of films. Once the optical constants of the first film are found, the thickness of a second film formed above the first film may be determined, assuming the thicknesses of all films stacked below the second film are known and the optical constants of all films stacked below the first film are known. The materials used in the following description are only examples of films for which the present method may be performed. The method may be used upon any film stack and is not limited to the film stack described below.

In an embodiment, it is desirable to determine the thickness of an interlevel dielectric after the interlevel dielectric has undergone a processing step. An accurate value for the thickness of a film may be determined prior to processing if the film thickness is above a pre-selected value and the optical constants and thicknesses of all underlying films are accurately determinable. However, subsequent to processing, a reasonable thickness of the film may be unattainable if the film thickness is reduced to below the above-mentioned pre-selected value. As shown in FIG. 2, a single reflected intensity measurement may correspond to several different thicknesses of a film. The thicker the film, the more maxima and minima values or inflections in the spectral response curve. Determining the thickness of a film may be accomplished by forming a model response curve that is a function of the optical constants. It is often assumed that when the model response curve best fits or is the same as the measured response curve, the thickness calculated for the film is a reasonable thickness. However, since the spectral response curve of a thin film has few inflections, it may seem that a best fit has been achieved when the calculated thickness is in error. On the other hand, when the thickness of a thick film that has several inflections is being determined, even a small error in thickness will cause the model curve to vary greatly from the measured curve.

The thickness of the interlevel dielectric is particularly hard to determine because it is deposited across an interconnect having a titanium nitride film disposed across a metal film. Since the optical constants of the titanium nitride are known to vary, determining the constants is necessary in order to determine the thickness of the processed dielectric. To find the optical constants of the titanium nitride film, the interlevel dielectric material, which may be oxide, is first deposited across a silicon substrate at certain deposition conditions. The silicon substrate preferably has a known thickness, and the optical constants of the substrate are well known. The interlevel dielectric material is deposited to a thickness that results in a spectral response curve having several inflections. Therefore, the CARIS technique may be used to determine the thickness of the interlevel dielectric accurately. Then the same interlevel dielectric material may be deposited at the same deposition conditions across the interconnect and across portions of the semiconductor topography not covered by the interconnect. Since the interlevel dielectric is deposited at the same conditions across the interconnect as across a bare silicon substrate, it can be assumed that the two have equivalent thicknesses.

Reflected light intensity measurements may be made to create a spectral response curve of the pre-processed interlevel dielectric film. The dielectric film may then be modeled using the known thickness of the dielectric film and by varying the optical constants of the titanium nitride film. When the model spectral response curve is the same as the measured response curve, the optical constants are assumed to be reasonably close to the actual values. Using these optical constants for the titanium nitride film, the interlevel dielectric may then be subjected to the processing step, and the thickness of the processed dielectric may be accurately determined from its spectral response curve.

BRIEF DESCRIPTION OF THE DRAWINGS

Other objects and advantages of the invention will become apparent upon reading the following detailed description and upon reference to the accompanying drawings in which.

Figure 1:
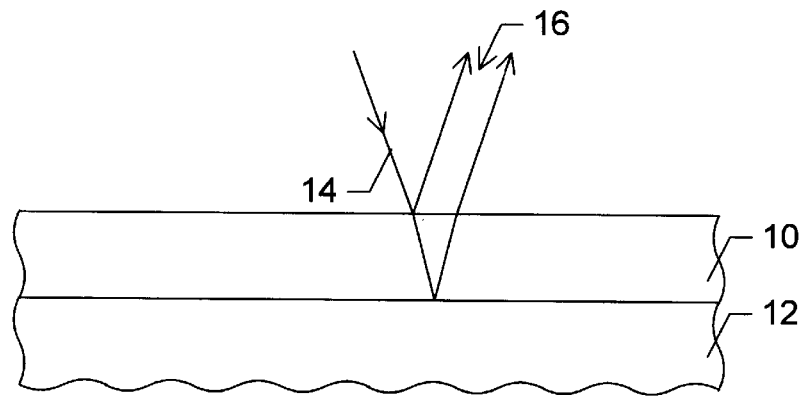
FIG. 1 depicts a cross-sectional view of a film disposed across a substrate, wherein light is reflected from the film surface and the film/substrate interface.
Figure 2:
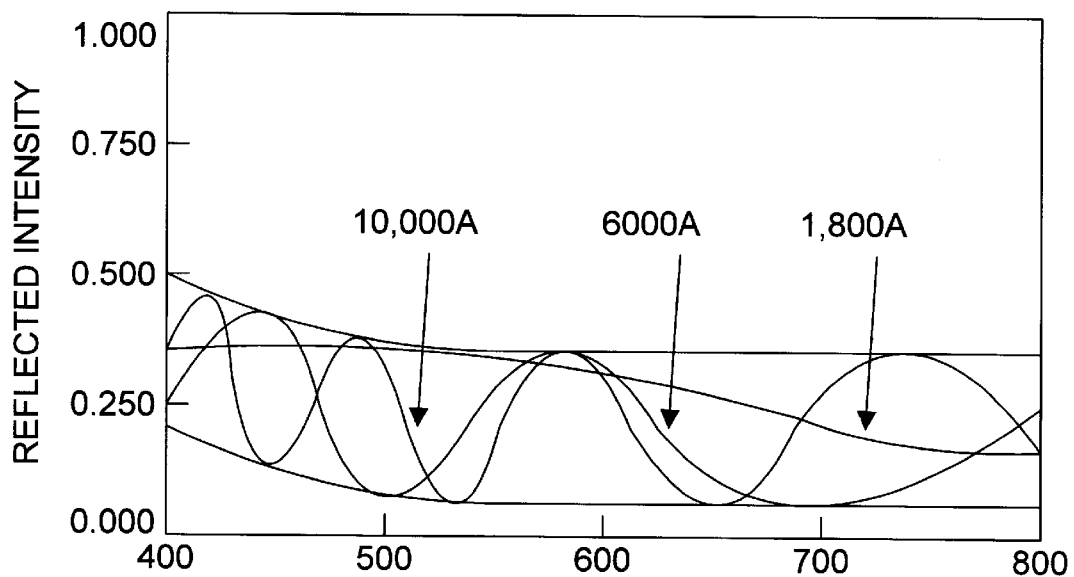
FIG. 2 depicts the spectral response curves of oxide films having different thicknesses.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3:
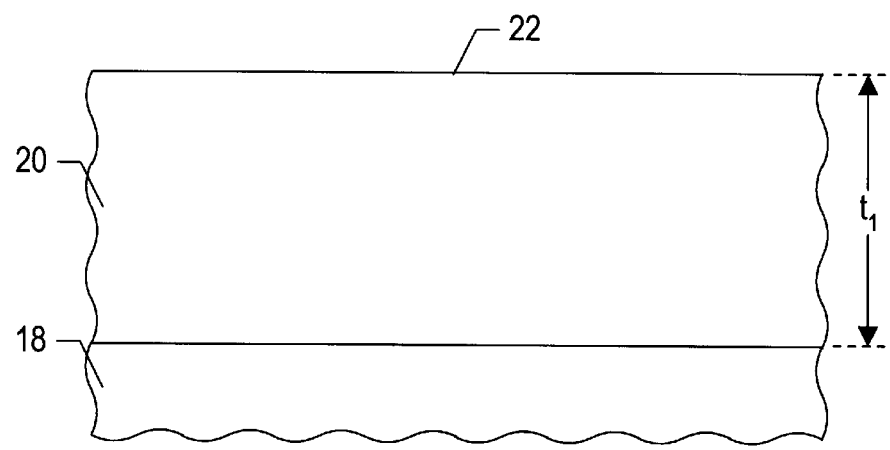
FIG. 3 depicts a cross-sectional view of an oxide film deposited across a silicon substrate, wherein a reflectance measurement of the oxide film is used to determine the thickness of the oxide film.

FIG. 3 illustrates an interlevel dielectric material, such as an oxide film 20 being deposited across a silicon substrate 18 using chemical vapor deposition. A pre-determined rate of deposition and length of deposition are used so that the thickness, $t_1$, of oxide film 20 is near a desired thickness. Substrate 18 and oxide film 20 may be illuminated using a white light source and narrow band spectral filters. The resulting intensity of reflected light may be measured over a range of wavelengths at point 22 of oxide film 20. Preferably, this range of wavelengths is in the range from 400–800 nm. Using the spectral response curve, the thickness of substrate 18, and the optical constants of substrate 18, the thickness, $t_1$, of oxide film 20 may be determined.

Figure 4:
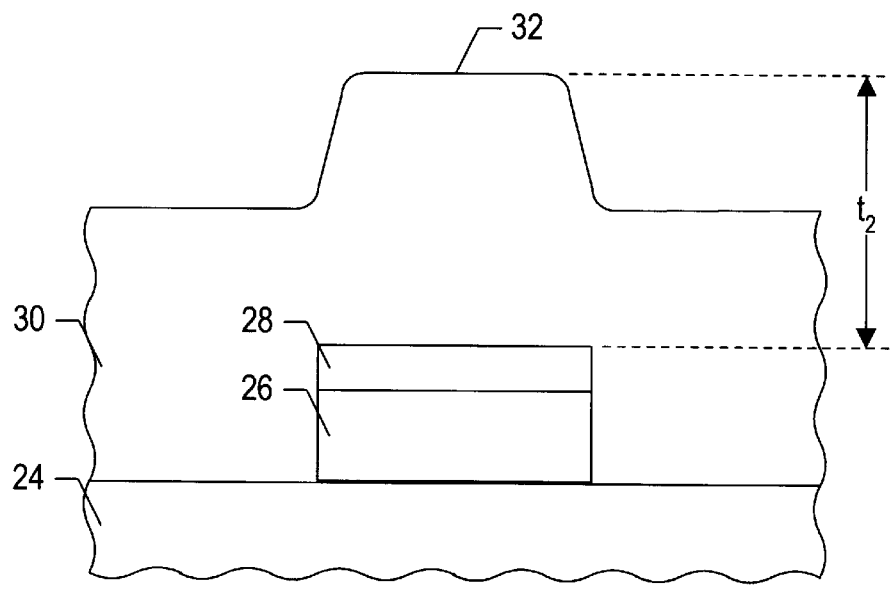
FIG. 4 depicts a cross-sectional view of an oxide film deposited across a titanium nitride film belonging to an interconnect.

Turning to FIG. 4, a metal film 26, e.g., an aluminum or copper film, is formed across a semiconductor topography 24. Semiconductor topography 24 may be another interlevel dielectric that is formed across an interconnect or a transistor (not shown). A titanium nitride film 28 is formed across metal film 26 to act as an anti-reflective coating over metal film 26. Both titanium nitride film 28 and metal film 26 may be layers of an interconnect. The interconnect is formed by blanket depositing the two films sequentially, followed by etching away unwanted portions of the films. The films may be etched by performing a plasma etch in which etch duration is chosen to terminate after select regions of topography 24 are exposed. An oxide interlevel dielectric 30 may be deposited across the exposed regions of topography 24 and across titanium nitride film 28.

Interlevel dielectric 30 is preferably deposited using the same deposition rate and length as used in the previous deposition of oxide film 20. The ratio of the thickness, $t_1$, of oxide film 20 to the thickness, $t_2$, of interlevel dielectric 30 above titanium nitride film 28 depends on the deposition method and may be determined empirically. Thus, the thickness, $t_2$, of interlevel dielectric 30 above titanium nitride film 28 can be correlated from the thickness, $t_1$, of oxide film 20. Reflectance measurements of reflected light at point 32 of interlevel dielectric 30 are then performed to obtain a spectral response curve since $t_2$ is large enough to provide for accurate measurements. The thicknesses of all films underlying interlevel dielectric 32 have known values. The optical constants, n and k, for all films except titanium nitride film 28 are also known values because processes used for the formation of these films are well controlled. To determine the optical constants for titanium nitride film 28, a spectral response curve may be modeled based on the thickness, $t_2$, of interlevel dielectric 30. Values for the optical constants may be varied until the measured spectral response curve is the same as the model response curve. Accurate optical constants are thus obtained.

Figure 5:
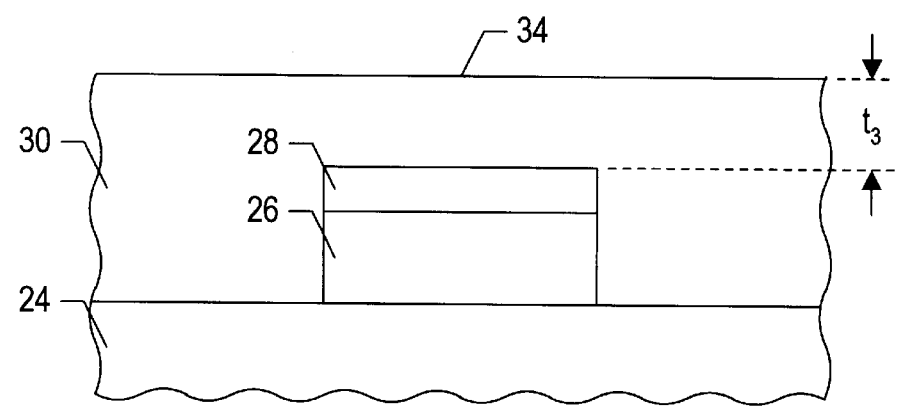
FIGS. 5–6 depicts a cross-sectional view of the oxide film after it has been polished, wherein a reflectance measurement of the oxide film is used to determine the thickness of the post-polished film.
Figure 6:
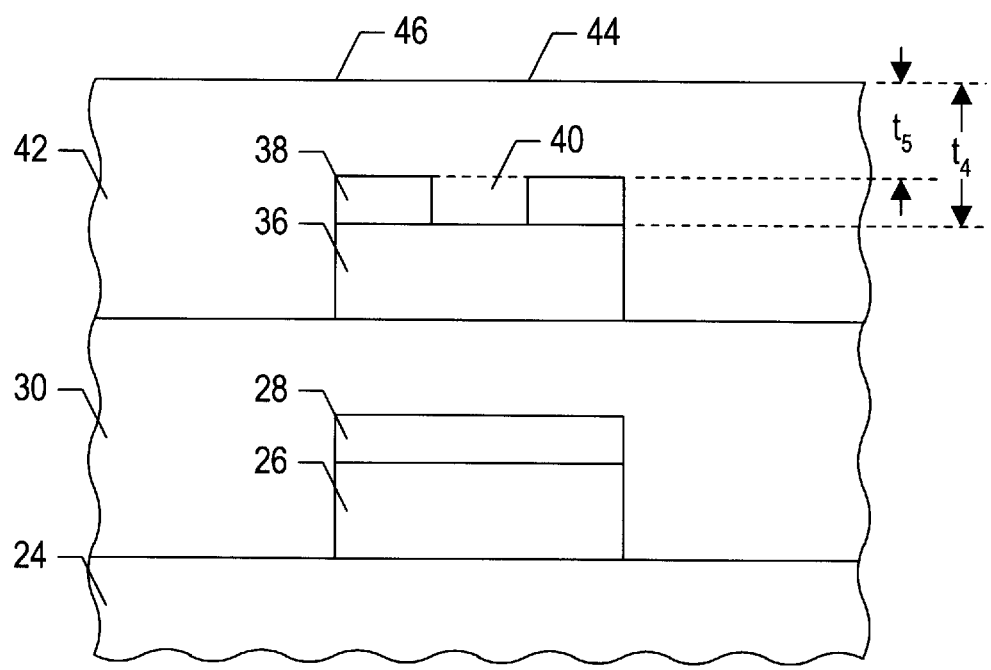

As shown in FIG. 5, interlevel dielectric film 30 may then be planarized using CMP. A spectral response curve is generated by measuring the intensity of reflected light at point 34 of post-CMP interlevel dielectric 30. Since the thicknesses and the optical constants of the films below interlevel dielectric 30 are known, including the aforesaid-derived optical constants of titanium nitride film 28, the thickness, $t_3$, of post-CMP dielectric 30 above titanium nitride film 28 may be calculated.

Further modifications and alternative embodiments of various aspects of the invention will be apparent to those skilled in the art in view of this description. For example, the embodiment of the method used when multiple film stacks exist may be used when a single film stack exists. The methods described may also be used to find thicknesses of films other than oxide and to find optical constants of films other than titanium nitride. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for determining optical constants of an underlying layer of material formed at an elevation level below a layer of material, comprising:

forming a layer of material of first pre-defined optical constants at predetermined conditions upon an underlying layer of material;

forming another layer of material of said first pre-defined optical constants at said predetermined conditions upon another underlying layer of material of second pre-defined optical constants, wherein said another layer of material is of substantially the same composition as said layer of material;

knowing said first pre-defined optical constants and said second pre-defined optical constants, measuring light reflectance from said another layer of material to determine a thickness of said another layer of material;

correlating the thickness of said another layer of material to be proportional to a first thickness of said layer of material having substantially the same composition; and knowing the first pre-defined optical constants and the first thickness of said layer of material, measuring light reflectance from said layer of material to determine optical constants of said underlying layer of material.

2. The method of claim 1, further comprising measuring reflectance from said layer of material subsequent to processing said layer of material for determining a post-processing thickness of said processed layer of material using said optical constants of said underlying layer of material derived from measuring light reflectance from said layer of material.

3. The method of claim 2, wherein processing comprises chemical-mechanical polishing said layer of material.

4. The method of claim 1, wherein measuring reflectance comprises measuring reflected intensity of light over a predetermined range of light wavelengths.

5. The method of claim 1, wherein measuring reflectance comprises measuring reflected intensity of light over a predetermined range of light wavelengths to form a measured spectral response curve, wherein determining said optical constants comprises fitting said measured response curve with a model response curve, said model response curve being formed by varying values for said optical constants.

6. The method of claim 1, wherein said first pre-defined optical constants comprise index of refraction and extinction coefficient of said another layer of material.

7. The method of claim 1, wherein said second pre-defined optical constants comprise index of refraction and extinction coefficient of said another underlying layer of material.

8. The method of claim 1, wherein said another layer of material comprises oxide.

9. The method of claim 1, wherein said another underlying layer of material comprises silicon.

10. The method of claim 1, wherein said layer of material comprises oxide.

11. The method of claim 1, wherein said underlying layer of material comprises titanium nitride.

12. The method of claim 1, wherein said another underlying layer of material has a predetermined thickness.

13. The method of claim 1, wherein said underlying layer of material has a predetermined thickness.

14. A method for determining optical constants of an underlying layer of material formed at an elevation level below a layer of material, comprising:

forming a layer of material to a first thickness upon an underlying layer of material;

forming another layer of material to said first thickness upon another underlying layer of material of pre-defined optical constants, wherein said another layer of material is of substantially the same composition as said layer of material;

knowing the first thickness and the pre-defined optical constants, measuring light reflectance from said another layer of material to determine the optical constants of said another layer of material;

correlating the optical constants of said another layer of material to be equivalent to optical constants of said layer of material having substantially the same composition; and knowing the optical constants and the first thickness of said layer of material, measuring light reflectance from said layer of material to determine optical constants of said underlying layer of material.

\* \* \* \* \*

UNITED STATES PATENT AND TRADEMARK OFFICE
CERTIFICATE OF CORRECTION

PATENT NO. : 5,835,226

DATED : November 10, 1998

INVENTOR(S) :
Berman et al.

It is certified that error appears in the above-identified patent and that said Letters Patent is hereby corrected as shown below:

In the Title Page:

Item [54] and Column 1, after "to be used" please insert --to--.

Signed and Sealed this

Ninth Day of March, 1999

Attest:

Q. TODD DICKINSON

Attesting Officer

Acting Commissioner of Patents and Trademarks